United States Patent
Sorbara et al.

(10) Patent No.: US 8,817,907 B2
(45) Date of Patent: Aug. 26, 2014

(54) SYSTEMS AND METHODS FOR SIGNALING FOR VECTORING OF DSL SYSTEMS

(75) Inventors: Massimo Sorbara, Freehold, NJ (US); Patrick Duvaut, Paris (FR); Amitkumar Mahadevan, Eatontown, NJ (US); Laurent Francis Alloin, Monmouth Beach, NJ (US)

(73) Assignee: Ikanos Communications, Inc., Fremont, CA (US)

(*) Notice: Subject to any disclaimer, the term of this patent is extended or adjusted under 35 U.S.C. 154(b) by 970 days.

(21) Appl. No.: 12/412,191

(22) Filed: Mar. 26, 2009

(65) Prior Publication Data

US 2009/0245340 A1  Oct. 1, 2009

Related U.S. Application Data

(60) Provisional application No. 61/039,714, filed on Mar. 26, 2008.

(51) Int. Cl.
*H04L 27/10* (2006.01)

(52) U.S. Cl.
USPC ........................................................ 375/284

(58) Field of Classification Search
CPC ............ H04B 1/38; H04B 3/32; H04B 17/00; G06F 11/00; G06F 11/07; H04J 1/12; H04J 3/10; H04L 12/28; H04L 25/49; H04L 27/00; H04L 29/02; H04M 3/002
USPC ......... 370/431, 201, 210, 286, 292, 315, 268, 370/401; 375/227, 259, 284, 296, 346, 222, 375/257, 285, 219, 260; 714/701, 704, 57, 714/799; 379/406.06, 417, 93.01
See application file for complete search history.

(56) References Cited

U.S. PATENT DOCUMENTS

| | | | |
|---|---|---|---|
| 5,479,447 A * | 12/1995 | Chow et al. | 375/260 |
| 7,843,949 B2 * | 11/2010 | Xu | 370/401 |
| 2003/0086514 A1 * | 5/2003 | Ginis et al. | 375/346 |
| 2005/0259725 A1 * | 11/2005 | Cioffi | 375/222 |
| 2006/0274893 A1 * | 12/2006 | Cioffi et al. | 379/399.01 |
| 2007/0213013 A1 * | 9/2007 | Kim | 455/69 |
| 2007/0254601 A1 * | 11/2007 | Li et al. | 455/88 |
| 2008/0212660 A1 * | 9/2008 | Tzannes | 375/219 |

(Continued)

OTHER PUBLICATIONS

Sorbara, M., Kanellakopoulos, I., "VDSL2: Proosed Framework for Enabling Downstream FEXT Cancellation in VDSL2", ITU Telecommunication Standardization Sector, Study Period 2005-2008, Com 15-C, 153-E, Oct. 2006.

(Continued)

*Primary Examiner* — Sam K Ahn
*Assistant Examiner* — Shawkat M Ali
(74) *Attorney, Agent, or Firm* — Pillsbury Winthrop Shaw Pittman LLP

(57) ABSTRACT

The measurement of far-end crosstalk (FEXT) in a Digital Subscriber Line communications is instrumental in the ability of using a multiple input multiple output (MIMO) pre-coder to cancel FEXT. A reliable robust back channel for transmission of error is instrumental to provide error samples for the proper operation of a MIMO pre-coder. Bins can be dedicated to insure bandwidth from the customer premises equipment (CPE) to the central office (CO). By increasing the margin used in the bins, robustness can be added to this back channel between the CPE and CO.

23 Claims, 16 Drawing Sheets

(56) References Cited

U.S. PATENT DOCUMENTS

| | | | |
|---|---|---|---|
| 2008/0263413 A1 | 10/2008 | Sorbara et al. | |
| 2009/0049347 A1* | 2/2009 | Shridhar et al. | 714/704 |
| 2009/0116639 A1* | 5/2009 | Zimmerman et al. | 379/417 |
| 2010/0278033 A1* | 11/2010 | Ilani | 370/201 |

OTHER PUBLICATIONS

Duvaut, P., Mahadevan, A., Sorbara, M., Gvdsl: Answers to questions and concerns related to reporting the error(f) for Self FEXT cancellation, ITU Telecommunication Standardization Sector, Study Group 15, Napa Valley, CA, Apr. 16-20, 2007.

Sorbara, M., Mohseni, M., Schelstraeta, S., Sjoberg, F., "Gvector: Proposed requirements in support of backward compatible crosstalk channel estimation of downstream vectoring.", ITU Telecommunication Standardization Sector, Study Group 15, Bordeaux, France, Dec. 3-7, 2007.

Sorbara, M., Duvaut, P., Oksman, V., "G.vector: Proposed Requirements for the Back Channel in G.vector", ITU Telecommunication Standardization Sector, Study Group 15, Charleston, SC, Apr. 7-11, 2008.

Sorbara, M., Duvaut, P., "G.vdsl: Possible Mechanisms for Implementation of FEXT Cancellation Back Channel", ITU Telecommunication Standardization Sector, Study Group 15, Napa Valley, CA Apr. 16-20, 2007.

Centillium, et al., "G.vdsl: Required changes for SOS implementation", ITU Telecommunication Standardization Sector, Study Group 15, ITU Telecommunication Standardization, Study Group 15, Oct. 2007.

Schelstraete, S., Eckert, E., Shridhar, A., "G.vdsl: Proposal for SOS protocol", ITU Telecommunication Standardization, Study Group 15, San Diego, CA Jan. 15-19, 2007.

* cited by examiner

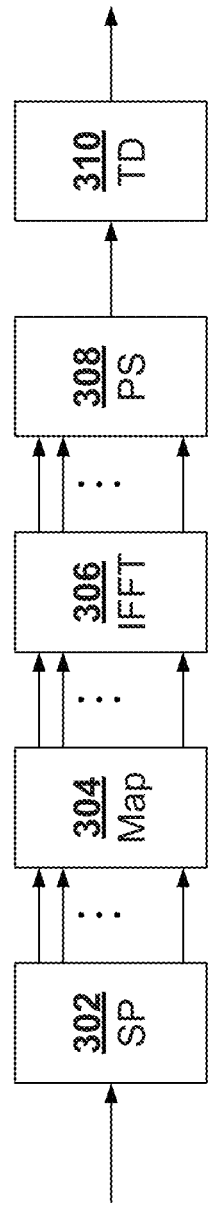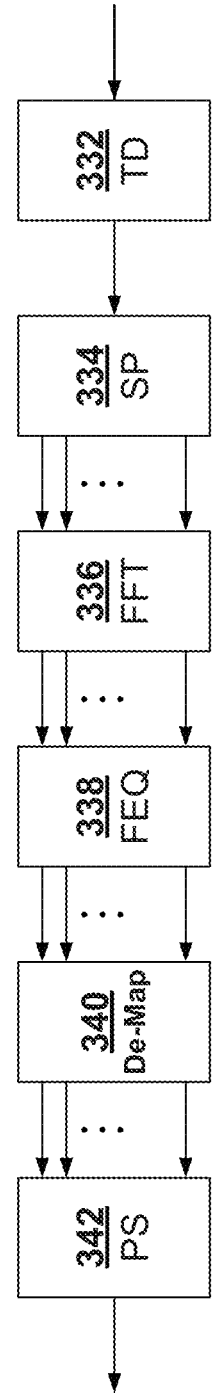

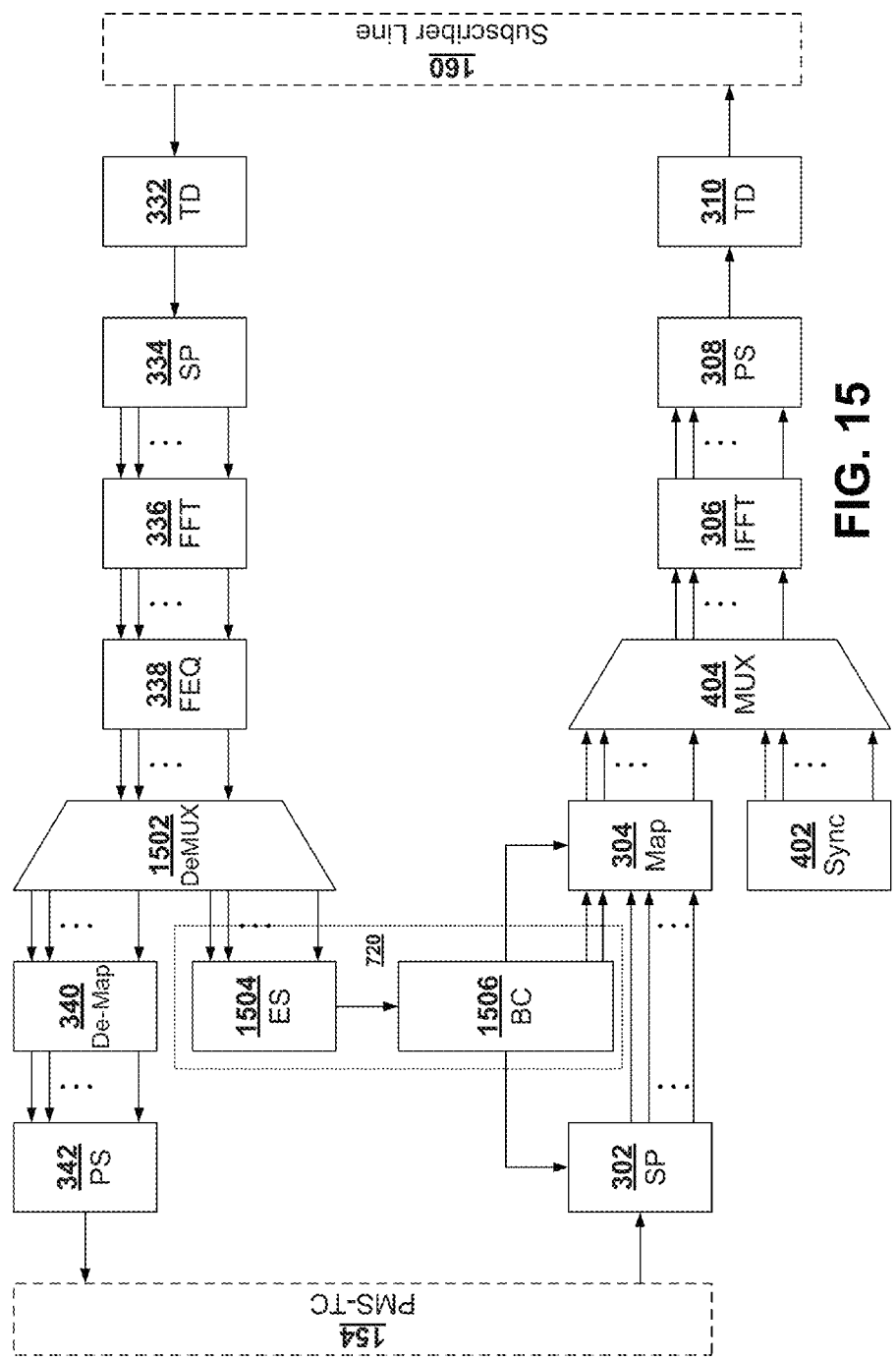

SYSTEMS AND METHODS FOR SIGNALING FOR VECTORING OF DSL SYSTEMS

CROSS-REFERENCE TO RELATED APPLICATION

Under 35 U.S.C. 119, this application claims priority to, and the benefit of, U.S. Provisional Patent Application entitled, "Definition of a Signaling Channel for Vectoring of DSL Systems," having Ser. No. 61/039,714, filed on Mar. 26, 2008, which is incorporated by reference in its entirety.

BACKGROUND OF THE INVENTION

1. Field of the Invention

The present invention relates to the Digital Subscriber Line (DSL) Systems and specifically to back channel signaling in the DSL system.

2. Related Art

High-bandwidth systems, including DSL systems, use baseband modulation, single-carrier modulation as well as multi-carrier modulation schemes. Both DSL and other high-bandwidth systems such as wireless use modulation schemes such as Quadrature Amplitude Modulation (QAM), Carrier-less Amplitude and Phase Modulation (CAP), and Discrete Multi-tone (DMT) for wired media and Orthogonal Frequency Division Multiplexing (OFDM) for wireless communication. One advantage of such schemes is that they are suited for high-bandwidth applications of 2 Mbps or higher upstream (subscriber to provider) and 8 Mbps or higher downstream (provider to subscriber). Quadrature Phase Shift Keying (QPSK) utilizes quadrature carrier phase shift keying to encode 2 bits of information on a carrier frequency by employing waves in the same carrier frequency shifted by increments of 90°, which can be thought of as sine and cosine waves of the same frequency. Since the sine and cosine waves are orthogonal, data can be encoded in the amplitudes of the sine and cosine waves. Therefore, 2 bits can be sent over a single frequency using the quadrature keying.

CAP is similar to QAM. For transmission in each direction, CAP systems use two carriers of identical frequency above the 4 kHz voice band, one shifted 90° relative to the other. CAP also uses a constellation to encode bits at the transmitter and to decode bits at the receiver. A constellation encoder maps a bit pattern of a known length to a sinusoid wave of a specified magnitude and phase. Conceptually, a sinusoidal wave can be viewed to be in one-to-one correspondence with a complex number where the phase of the sinusoidal is the argument (angle) of the complex number, and the magnitude of the sinusoidal wave is the amplitude or modulus of the complex number, which in turn can be represented as a point on a real-imaginary plane. Points on the real-imaginary plane can have bit patterns associated with them, and this is referred to as a constellation and is known to one of ordinary skill in the art.

DMT modulation, sometimes called OFDM, builds on some of the ideas of QAM but, unlike QAM, it uses more than one constellation encoder where each encoder receives a set of bits that are encoded and outputs sinusoid waves of varying magnitudes and phases. However, different frequencies are used for each constellation encoder. The outputs from these different encoders are summed together and sent over a single channel for each direction of transmission. For example, common Asymmetric Digital Subscriber Line (ADSL) DMT systems divide the spectrum from 0 kHz to 1104 kHz into 256 narrow channels called bins (sometimes referred to as tones, DMT tones, or sub-carriers). These bins are 4.3125 kHz wide. The waveforms in each bin are completely separable from one another, i.e., orthogonal to each other. In order to maintain "orthogonality," the frequencies of the sinusoids used in each bin should be multiples of a common frequency known as the fundamental frequency and in addition the symbol period τ, must be a multiple of the period of the fundamental frequency or a multiple thereof. In a DMT system, the number of bins is 256 for ADSL/ADSL2, 512 for ADSL2+ and 4096 for Very High Speed Digital Subscriber Line 2 (VDSL2). Each bin can carry a certain number of bits; this number can vary due to factors such as attenuation on the line, noise and crosstalk in the cable, and the transmit signal power spectral density (PSD). The aggregate bit pattern which comprises the bit patterns mapped to constellations in each of the bins during a symbol period is often referred to as a DMT symbol. For the purposes here, time domain references are often referred to in terms of DMT symbol periods also referred to as symbol periods.

FIG. 1 illustrates DSL communications layering in communications between central office (CO) 172 and customer premises equipment (CPE) 174. The communications has a downstream component from CO 172 to CPE 174 and an upstream from CPE 174 to CO 172 component.

Within CO 172 is layer 142, the Transport Protocol Specific-Transmission Convergence (TPS-TC) layer. At this layer support for application specific transports such as ATM or Ethernet are implemented. The function of the TPS-TC is to convert the payload data with appropriate framing into a bit rate for transport to the Physical Media Specific-Transmission Convergence (PMS-TC) layer. The gamma interface delineates the TPS-TC from the layer 2 applications above.

The next layer is layer 144, the PMS-TC layer. This layer manages framing, transmission, and error control over the line. In particular, this layer comprises the forward error correction (FEC) codes such as the Reed-Solomon (RS) Codes and interleaving. The interface between the TPS-TC and the PMS-TC layer is referred to as the alpha interface in the CO unit 172 and the beta interface in the CPE unit 174. It is very common that the transmit portion of the PMS-TC layer 144 comprises scrambler 102, RS encoder 104 and interleaver 106 to implement a RS code with interleaving (RS-ILV). DSL standards mandate the use of RS as the FEC.

The next layer is layer 146, the physical media dependent (PMD) layer. In the transmit portion, the PMD layer encodes, modulates and transmits data across physical links on the network. It also defines the network's physical signaling characteristics. In particular, constellation encoding and trellis codes map data into DMT symbols which are converted into time domain signals through the use of an IFFT where the time domain signal can be transmitted across subscriber line 160. The trellis code can also supply additional error correction. The interface between the PMD layer and the PMS-TC layer is referred to as the delta interface.

After processing by the PMD layer, the data is transmitted across subscriber line 160, where it is received by CPE 174 using its PMD layer 156. In a receiving capacity PMD layer 156 decodes, demodulates and recovers the data received across physical links on the network. Furthermore, PMS-TC layer 154 in a receiving capacity decodes data encoded by PMS-TC 144 and extracts data from the framing scheme. In particular it can comprise de-interleaver 108, RS decoder 110, and descrambler 112 to extract data encoded by PMS-TC 144. Finally, TPS-TC layer 152 is the transport protocol specific transmission conversion layer, configured for interfacing to specific transport protocols such as ATM or Ethernet.

In the upstream direction, CPE 174 transmits to CO 172. In the transmission, TPS-TC layer 152 functions in a similar fashion for CPE 174 as described for TPS-TC 142 in CO 172. Similarly PMS-TC 154 functions in a similar fashion as described for PMS-TC 144 and may additionally comprise scrambler 122 analogous to scrambler 102 in the downstream portion of TPC-TC 142, RS encoder 124 analogous to RS encoder 104 in the downstream portion of TPC-TC 142, and interleaver 126 analogous to interleaver 126 in the downstream portion of TPC-TC 142. PMD layer 156 functions in a similar fashion as described for PMD layer 146 in the downstream portion. The encoded and modulated signal is then transmitted from CPE 174 to CO 172 through subscriber line 160.

CO 172 in PMD layer 146, upon receiving the upstream encoded and modulated signal, performs the analogous decoding, demodulating and receiving of data across DSL to the downstream portion of PMD layer 156. The upstream portion of PMS-TC 144 functions similarly to the downstream portion of PMS-TC 156 and can comprise de-interleaver 128, RS decoder 130 and descrambler 132 analogous to de-interleaver 108, RS decoder 110, and descrambler 134, respectively. Finally, TPS-TC 142 functions in the upstream portion function similarly to TPS-TC 152 in the downstream portion.

More specifically, FIG. 2 illustrates a more detailed description of the transmission side of the PMS-TC layer (i.e., the downstream portion of PMS-TC 144 or the upstream portion of PMS-TC 154) as disclosed by present xDSL standards. Data from the TPS-TC layer transmitted to the PMS-TC layer can use one of two latency paths and one of two bearer channels. Input 202 represents data on the first bearer channel designated for latency path #0. Input 204 represents data on the second and optional bearer channel designated for latency path #0. Input 206 represents data on the first bearer channel optionally designated for latency path #1 when not designated in latency path #0. Input 208 represents data on the second bearer channel optionally designated for latency path #1. In addition, overhead data can be received by the PMS-TC layer including Embedded Operations Channel (EOC) 210, Indicator Bits (IB) Channel 212 and Network Timing Reference (NTR) 214, which can be combined by overhead multiplexer (MUX) 218. In addition, MUX 216 combines inputs 202 and 204, and MUX 220 as part of optional latency path #1 combines input 206 and 208. MUX 222 combines the output of MUX 216 with a sync byte and overhead data from MUX 218. Similarly MUX 224 combines the output of MUX 220 with an overhead sync byte and overhead data from MUX 218. Along each latency path, scrambler 226 and corresponding scrambler 228 scramble the data received from MUX 222 and MUX 224, respectively. FEC 230 and FEC 232 apply an FEC to the scrambled data from scramblers 226 and 228, respectively. Typically, the FEC used is a RS code and in the example of FIG. 1, FEC 230 and/or 232 can be RS encoder 104. Interleaver 106 of FIG. 1 comprises interleaver 234 and interleaver 236 which performs the interleaving of the encoded data received from FEC 230 and FEC 232, respectively. It should be noted that the FEC and interleaver parameters can generally be configured differently for each latency path. Finally, MUX 238 combines the encoded interleaved data for both latency paths to produce output 240 which is ready for processing by the PMD layer.

FIG. 3A illustrates a more detailed description of the transmission side of the PMD layer. Data is received as serial data by the PMD layer from the PMS-TC layer. This serial data is converted from a serial bit stream to parallel form by serial-to-parallel converter 302 for mapping into M parallel sub-channels, each sub-channel representing a specific sub-carrier. Each parallel sub-channel represents one of the bins or sub-carriers used, so for ADSL, serial-to-parallel converter 302 would produce 256 parallel sub-channels and for VDSL, serial-to-parallel converter 302 would produce 4096 parallel sub-channels. The various parallel bit sequences are passed to symbol mapper 304. Symbol mapper 304 maps each bit sequence into a constellation point within each sub-carrier (i.e., a DMT sub-symbol). For example, if the bit sequence relative to a specific sub-carrier comprises 3 bits, depending on the value of the three bits it is mapped to one of the eight points indicated by constellation 554 in FIG. 5. If the bit sequence comprises 5 bits, the bit sequence is mapped to one of the 32 points indicated by constellation 558. Furthermore, to increase robustness, the bit sequence can be transformed by a trellis encoder prior to the mapping onto a constellation point. The collection of the DMT sub-symbols mapped by symbol mapper 304 comprises the DMT symbol. Each sub-system is a complex number represented by a constellation point where the corresponding constellation represents points on the complex plane. As such inverse fast Fourier transform (IFFT) 306 becomes a modulator taking the collection of DMT sub-symbols as complex-valued numbers and provides M complex output samples which are converted to 2×M output real samples by taking the complex conjugates of the M samples. The parallel outputs of IFFT 306 are applied to parallel-to-serial converter 308 to provide a serial output signal. Essentially, the serial output signal is a digital time domain signal which undergoes additional time domain processing by time domain module 310 to produce a signal suitable for transmission of a subscriber line. Time domain module 310 can comprise components such as a cyclic prefix block, an up-sampler, and interpolator and a digital-to-analog converter to produce a continuous time domain signal.

FIG. 3B illustrates a more detailed description of the reception side of the PMD layer. An analog signal is received over the subscriber line where time domain module 332 provides a variety of time domain signal processing and can comprise components such as an analog gain module, an analog-to-digital converter and a digital gain adjustment module. The resultant digital time domain signal is converted to parallel sub-channels using serial-to-parallel converter 334. The parallel sub-channels are converted to frequency domain using FFT 336. Frequency equalizer 338 which has been previously trained during the initialization can apply selected gain to each frequency. The resultant frequency data corresponds to constellation points in a constellation associated with the sub-carrier corresponding to the sub-channel which is then unmapped by de-mapper 340 which can comprise a trellis code decoder back into digital data. The de-mapped digital data is then reassembled into a serial stream of bits by parallel-to-serial-converter 342 where the data is then handled by the PMS-TC layer.

While FIG. 3A shows an overview of the coding and modulation process taking place in the PMD layer, FIG. 4 shows the inclusion of a sync symbol. A sync symbol, which is not to be confused with the sync byte introduced in the PMS-TC layer which is used for overhead framing, is used to define the boundary of a DMT superframe. Typically, a sync symbol is followed by a predetermined number of data symbols. Together they define the DMT superframe. Typically, the superframe comprises a sync symbol and 256 data symbols. Characteristically, a sync symbol comprises 2-bits per available bin and is set to a well defined sequence of all ones or all zeros. A quadrant scrambler may then rotate the sync symbol as mapped onto the appropriate constellation. On the contrary, when user data is mapped on a DMT symbol, each bin has a certain number of bits which can be carried, the numbers vary due to factors such as line attenuation, noise and crosstalk in the cable, and the transmit signal PSD. In order for a bin to be useable, the signal-to-noise ratio (SNR) must be large enough to load 2 bits; alternatively, one bit of information may be loaded across multiple bins with lower SNR (referred as one bit constellations).

More specifically, in FIG. 4 between mapper 304 and IFFT 306 is MUX 404 which includes a sync symbol produced by sync symbol module 402 after a predetermined number of user data symbols have been processed. The sync symbol module 402 generates the sync symbol based on a well defined sequence of 2-bit symbols of all ones or all zeros and with the application of a quadrature scrambler.

During an initialization phase, SNR measurements are taken for each bin, which are used in that initialization phase to determine the number of bits that can be transmitted reliably over each bin. The process of determination is referred to as bit loading. To determine a bit loading profile, factors such as the transmit PSD, the ratio of useful receive signal power to total noise power, which includes background noise and other external noise sources such as crosstalk. FIG. 5 shows an example of a bit loading profile. For illustration purposes only 23 bins are shown in this example; bins 502, 504, 516, and 528 carry no data. Other bins carry varying amounts of data. Each combination of bits across all bins comprise a DMT symbol. Additionally, associated with each bin is a constellation for mapping bits onto the subcarrier. For example, bin 520 is only capable of carrying 2-bits, so mapper 304 maps 2-bits of data to a constellation point on constellation 552. Likewise, bin 522 is capable of carrying 5-bits, so mapper 304 maps a given 5-bits of data to a constellation point on constellation 558. In the same fashion bin 524 which can carry 3-bits is associated with constellation 554, and bin 526 which can carry 4-bits is associated with constellation 556. Each DSL standard defines the association of the number of bits with a particular constellation.

As mentioned previously crosstalk is a ubiquitous source of noise in a DSL system. FIG. 6 illustrates the various types of crosstalk typically experienced in a DSL system. For simplicity, CO 610 comprises two transceivers communicating over two subscriber lines to two CPEs. Transceiver 602 is in communications with CPE 604 and transceiver 606 is in communications with CPE 608. For the sake of example, the crosstalk from CO 606 and CPE 608 to either CO 602 or CPE 604 is described. However, it should be understood that interference may also be between the transmitter and receiver on the same subscriber line in both the upstream and downstream paths, which is the near-end echo of the transmit signal. The term "far-end" refers to when the source of interference is away from the receiving side and the term "near-end" refers to when the source of interference is close to the receiving side. For example, interference shown by arrow 612 illustrates noise generated by transceiver 606 coupled into the downstream communications and received by CPE 604. The term "victim" is applied to the line or the circuit being examined for crosstalk, and the term "disturber" is applied to the source of the crosstalk. Since the noise is generated away from the receiving side, this is referred to as downstream far-end crosstalk (FEXT). Likewise, interference shown by arrow 614 illustrates upstream near-end crosstalk (NEXT). Interference shown by arrow 616 illustrates upstream FEXT, and interference shown by arrow 618 illustrates downstream NEXT. In particular, downstream FEXT is a ubiquitous source of noise in VDSL. Accordingly, various needs exist in the industry to address the aforementioned deficiencies and inadequacies, such as mitigating downstream FEXT.

SUMMARY OF INVENTION

A system and method for providing dedicated back channel communications for error samples in a DSL system comprises initially reserving a set of reserved bins for back channel communications. Once the bins are reserved for back channel communications, error samples can be encoded and mapped onto this set of reserved tones. During a given DMT superframe, the encoded and mapped error samples are transmitted along side of user data on non-reserved tones from the CPE to the CO. An orthogonal pilot sequence transmits samples transmitted during the sync frame associated with a downstream DMT superframe. Error samples are measured from the transmitted orthogonal pilot sequences and transmitted back to the CO in the next upstream DMT superframe.

The selection of the reserved bins is related to the bits per bin allocation or bit loading process. For robustness, the allocation of bits per bin for the reserved bins uses a higher SNR margin over bins that are used to carry conventional user data. An alternative approach to selection of the number of bits per bin for the reserved bins is to take the existing bit loading profile and assign fewer bits than the number of bits specified in the bit loading profile. An optimal method of selection of the set of bins to reserve is to select the bins with the highest SNR.

In addition to providing the error samples, the back channel can be used to acknowledge commands received from the CPE and can also include error detection information such as a cyclic redundancy code (CRC). The commands can specify the bin group for which error measurements are desired as well as the resolution of these error measurements. Furthermore, the system and methods described above can be embodied in a DSL modem comprising a processor, a line driver, and memory comprising instructions to perform the methods described above.

A CO can also be equipped as a system with a method for measuring downstream errors. This method comprises transmitting orthogonal pilot sequences to one or more CPEs during synchronized sync symbols, where the pilot sequences transmitted by any two CPEs are orthogonal. Following the transmission of the DMT superframe containing each sync symbol, error samples are returned in the following upstream DMT superframe in the form of a message block which might include an acknowledgement to the error sampling command issued by the CO. The message block is received over a dedicated back channel as described above.

Other systems, methods, features, and advantages of the present disclosure will be or become apparent to one with ordinary skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A illustrates a more detailed description of the transmission side of the PMD layer;

FIG. 3B illustrates a more detailed description of the reception side of the PMD layer;

FIG. 15 illustrates an implementation of the PMD layer in a CPE in accordance with an embodiment of the invention.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 7:
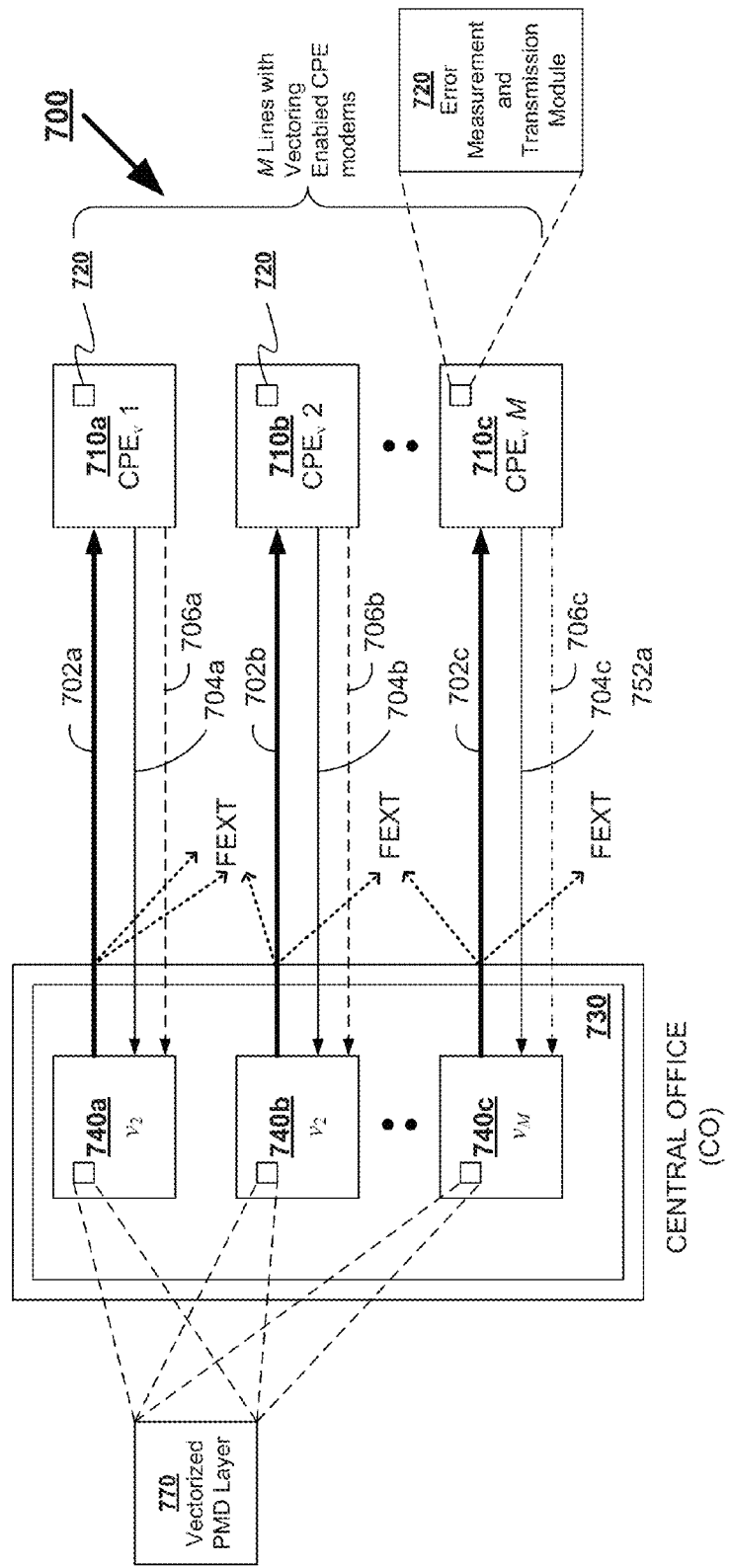
FIG. 7 illustrates a DSL system in accordance with one embodiment.

FIG. 7 illustrates a DSL system in accordance with one embodiment. CO 730 comprises a plurality of transceivers represented by transceivers 740a, 740b, and 740c. Each line card can comprise one or more transceivers. The transceivers are connected to CPEs 710a, 710b, and 710c, respectively, through separate subscriber lines. In the diagram, each subscriber line is broken down into its upstream and downstream paths. The downstream paths for transceivers 740a, 740b, and 740c are indicated by arrows 702a, 702b, and 702c, respectively. Similarly, the upstream paths for transceivers 740a, 740b, and 740c are indicated by arrows 704a, 704b, and 704c, respectively. In this figure, only three of the M vectoring enabled CPEs are shown as CPEs 710a, 710b and 710c.

As signals are transmitted downstream from the CO 730 onto the DSL loops, a certain amount of energy effectively leaks from one downstream CO transmitter into an adjacent CPE receiver, thereby creating the undesired FEXT signal into adjacent receivers. To combat FEXT, the transceivers coupled to vectoring enabled CPEs have transmitters that can share information and coordinate transmission in the form of multiple input multiple output (MIMO) pre-coding signals indicated by vectorized PMD layer 770.

Figure 8:
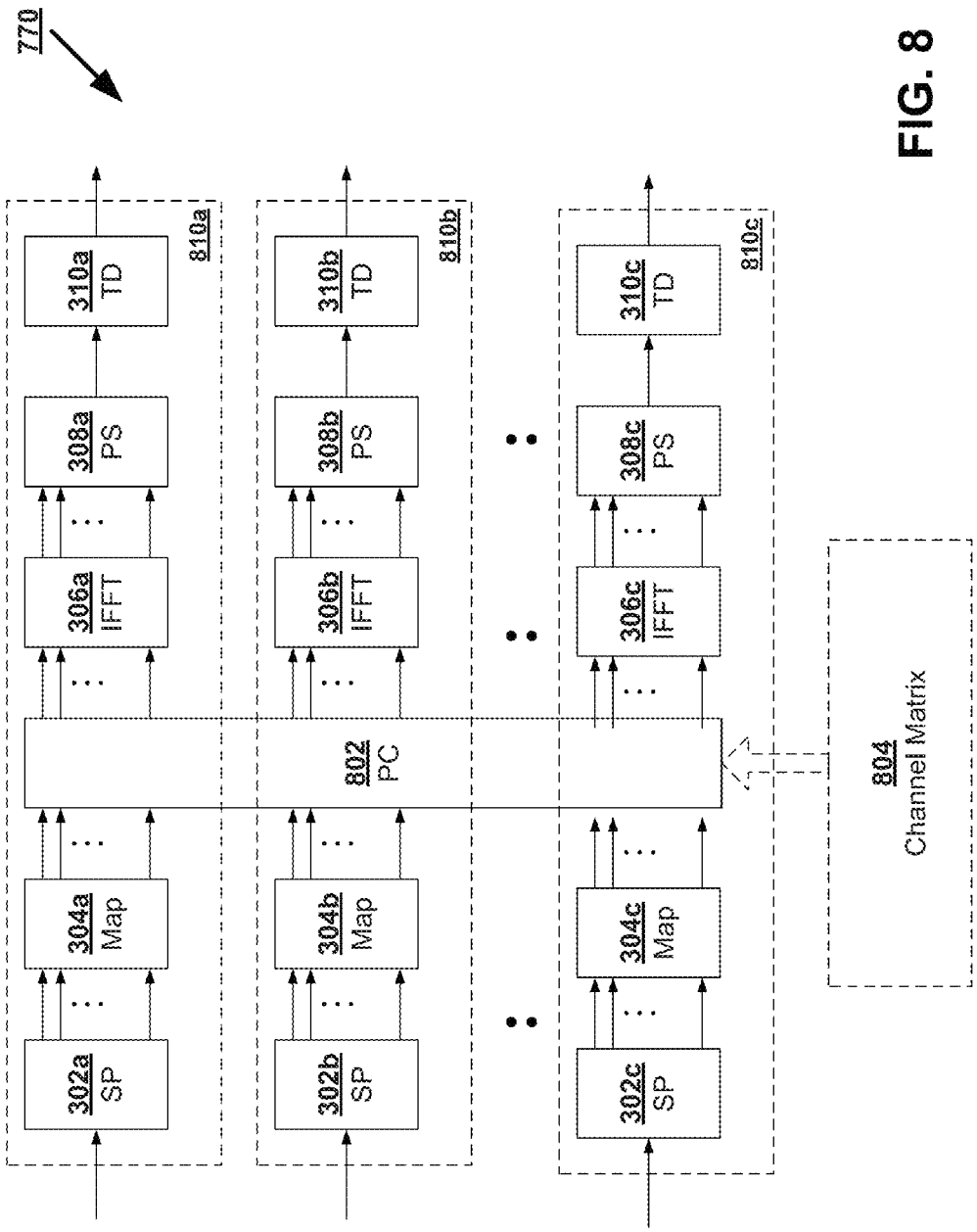
FIG. 8 illustrates an exemplary embodiment of a vectorized PMD layer.

FIG. 8 illustrates an exemplary embodiment of vectorized PMD layer 770. For each transceiver, the PMD layer resembles that shown in FIG. 3 with MIMO pre-coder 802 inserted between the mapper in each transceiver and the IFFT. The detailed PMD layers for transceivers 740a, 740b and 740c are indicated as PMD layers 810a, 810b and 810c, respectively.

The purpose of the MIMO pre-coder is to compensate at the transmitter for the undesired FEXT addition to the subscriber lines. Pre-coding (or pre-cancellation) is performed by means of a matrix operation (shown as channel matrix 804) that takes as input the transmit data samples (i.e., mapper outputs on the CO side) and outputs pre-compensated data sample for input to the IFFT on the CO side. The pre-compensation is such that the FEXT at each of the far-end receivers in the vectored group is cancelled. In order for pre-coding to work, the data symbols of all users should be synchronized and aligned at the transmitter output, so that the pre-coding matrix presents a complete independence between all subcarriers of the vectored DMT system. With proper synchronization and alignment of DMT symbols, the pre-coder operation can be seen as a matrix multiplication per each subcarrier across all the users in the vectored group. In all generality, the per subcarrier pre-coder coefficient converges to the inverse of the FEXT coupling channel matrix that exists among the vectored users. The derivation of the pre-coder coefficients can be performed after a FEXT coupling channel analysis phase, during which known signal sequences are being transmitted by each transmitter with a well determined pattern. Further detail in deriving optimal pre-coding matrices can be found in U.S. patent application Ser. No. 11/845,040 filed on Aug. 25, 2007, which is hereby incorporated by reference.

Figure 9:
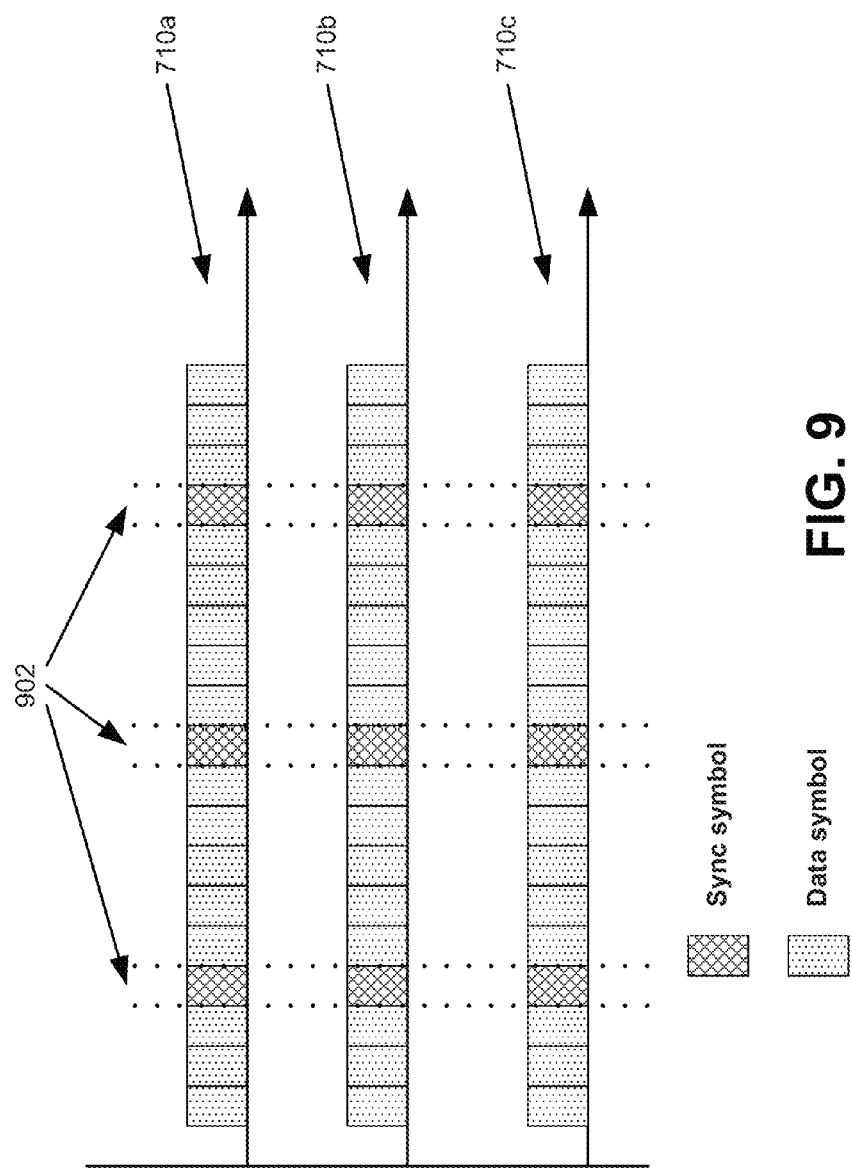
FIG. 9 illustrates a timing diagram showing vectoring enabled CPEs synchronized and aligned.

One key feature that enables vectoring is alignment and synchronization of the transmitted DMT symbols. FIG. 9 illustrates a timing diagram showing transceivers connected to vectoring enabled CPEs synchronized and aligned. As can be seen, vectoring enabled CPEs represented by timing diagrams associated with CPE 710a, 710b, and 710c receive synchronized sync symbols as indicated by the symbol periods referenced as 902. Consequently, the received DMT symbols as well as the DMT super frames are synchronized in vectoring enabled CPEs. This alignment is controlled by the CO, is required for synchronous operation and ensures orthogonality among the M vectoring enabled users.

Returning to FIG. 7, another key element among the features needed for vector enabled CPEs is the ability to measure and report error samples in support of vectoring. Each vectoring enabled CPE comprises error measurement and transmission module 720. Error measurement and transmission module 720 is responsible for measuring the error samples in the sync symbols seen at the CPE and propagating the error measurement back to CO 730 and the vector processing entity. In this way the FEXT coupling channel can be identified, and the proper pre-coder coefficients can be derived. While this can be performed during initialization, due to the slow varying nature of a DSL channel, it is desirable to continue updating the FEXT pre-coders during data mode in order to track the channel variation. Hence, it is desirable for the vectoring enabled CPEs to comprise an error measurement and transmission module to periodically feed the CO with their error samples.

To facilitate the measurement of error samples, CO 730 can transmit commands to each CPE. The commands can instruct the CPE on which bin or group of bins to make error measurements, how many measurements to make, and the resolution of the corresponding error samples to be reported. In order to minimize the overhead, at initialization the set of all eligible bins (known as the MEDLEY set) can be divided into specific bin groups and assigned a unique numeric identifier. These bin groups do not have to be mutually exclusive. These bin groups can also contain only one bin. The CO can request measurements for a specific bin group by using the unique identifier in a command to the CPE. Furthermore, the bin groups could comprise $M_{TG}$ bins and be in the natural numeric order, that is bin group 1 would comprise bins 1 ... $M_{TG}$ and bin group 2 would comprise bins $M_{TG}+1$ ... $2M_{TG}$. Although the preceding example shows contiguous blocks of bins. There may be bins either not in the MEDLEY set or not capable of transmission, which can be excluded from each bin group, so the allocation to each bin group can be adjusted to exclude these bins while maintaining $M_{TG}$ bins in the bin group. So as a further example, bin group I could comprise bins 1 ... $B_{BAD}-1$, $B_{BAD}+1$ ... $M_{TG}+1$ where bin $B_{BAD}$ is incapable of carrying any traffic.

It should be noted that the number of error samples to request and corresponding resolution will depend on the phase of adaptation, i.e., learning, tracking, and joining phases. For example, in a learning phase, as part of the training protocol, specific signals are defined to encode the error samples onto special operations channel (SOC) bins for robust transfer until the channel training is complete and any data transmission is configured reliably. However, during the tracking phase and joining phase (i.e., when new lines join), the error samples are transported through the back channel. Therefore, in order to facilitate the transport of error samples in data mode, a back channel is used as indicated by paths 706*a*, 706*b*, and 706*c*, and described below.

Figure 10:
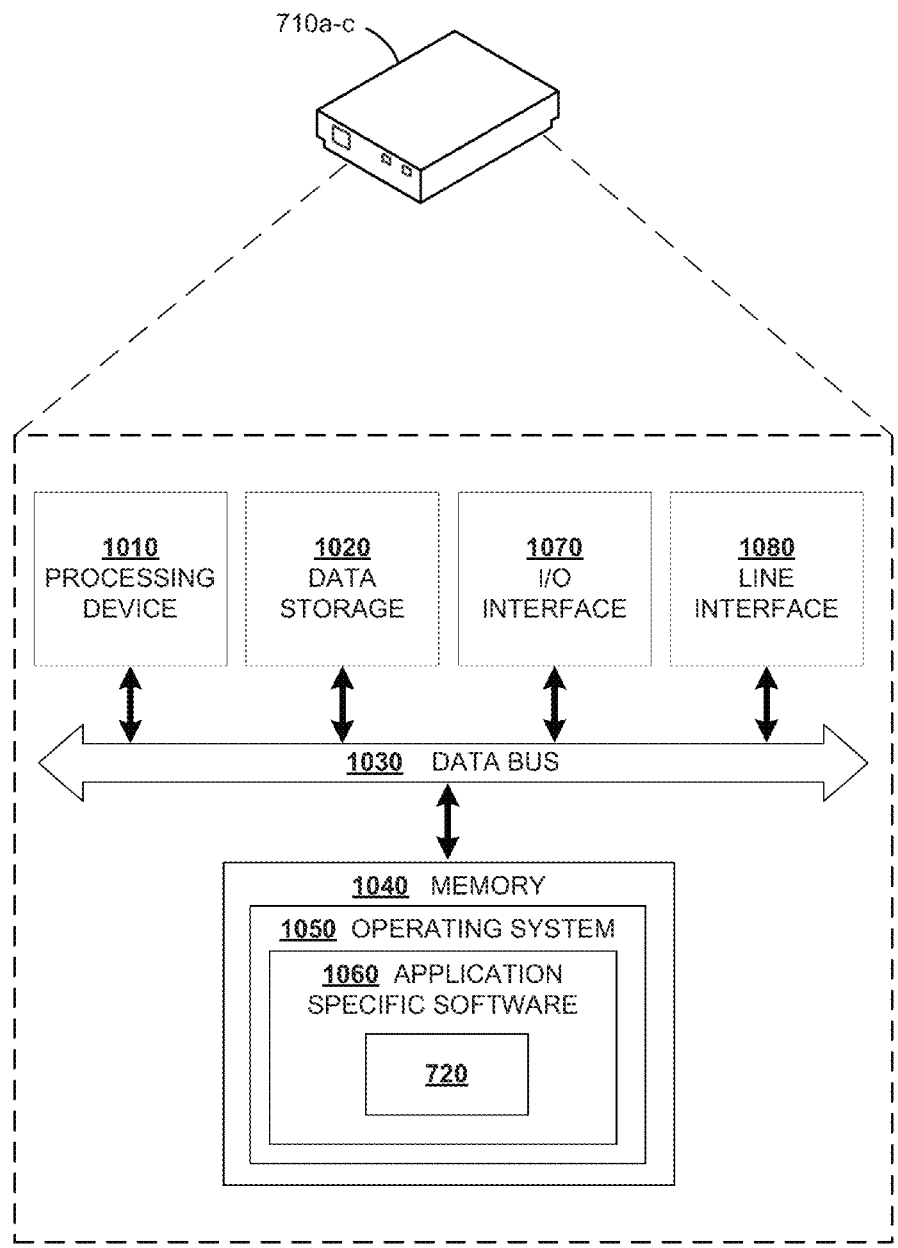
FIG. 10 is a block diagram of an embodiment of one of the vectoring enabled CPEs.

FIG. 10 is a block diagram of an embodiment of one of the vectoring enabled CPEs depicted in FIG. 7. In accordance with certain embodiments, the steps for normalized error measurements and back channel signaling described in this disclosure may be incorporated in software within a CPE such as a DSL modem. One of ordinary skill in the art will appreciate that DSL modems comprise other components, which have been omitted for purposes of brevity. Generally, DSL modem 710*a-c* may include processor 1010, memory component 1040 (which may include volatile and/or nonvolatile memory components), and data storage component 1020 that are communicatively coupled via a local interface 1030 such as a data bus. In addition, the DSL modem 710*a-c* comprises an input/output interface 1070 which can be coupled to an end user device such as a PC, router, wireless access point, etc. and can be an Ethernet interface. DSL modem 710*a-c* further comprises line interface 1080 which can be coupled to the DSL loop to communicate with a CO. Line interface 1080 can comprise elements such as a line driver, analog front end and DSL transceiver.

The local interface 1030 may have additional elements, which are omitted for simplicity, such as controllers, buffers (caches), drivers, repeaters, and receivers to enable communications. Further, the local interface may include address, control, and/or data connections to enable appropriate communications among the aforementioned components. Processor 1010 may be a device for executing software, particularly software stored in memory component 1040. Processor 1010 can be any custom made or commercially available processor, a central processing unit (CPU), an auxiliary processor among several processors associated with DSL modem 410*a-b*, a semiconductor based microprocessor (in the form of a microchip or chip set), a macroprocessor, or generally any device for executing software instructions.

Memory component 1040 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, memory component 1040 may incorporate electronic, magnetic, optical, and/or other types of storage media. One should note that some embodiments of memory component 1040 can have a distributed architecture (where various components are situated remotely from one another), but can be accessed by processor 1010.

The software in memory component 1040 may include one or more separate programs, each of which includes an ordered listing of executable instructions for implementing logical functions. In the example shown in FIG. 10, the software in the memory component 1040 may include an operating system 1050. Furthermore, the software residing in memory 1040 may include application specific software 1060, which may further include module 720 for normalized error measurements and for back channel signaling. It should be noted, however, that these modules can be implemented in software, hardware or a combination of software and hardware. The operating system 1050 may be configured to control the execution of other computer programs and provides scheduling, input-output control, file and data management, memory management, and communication control and related services.

A system component and/or module embodied as software may also be constructed as a source program, executable program (object code), script, or any other entity comprising a set of instructions to be performed. When constructed as a source program, the program is translated via a compiler, assembler, interpreter, or the like, which may or may not be included within the memory component 1040, so as to operate properly in connection with the operating system 1050. When the DSL modem 710*a-c* is in operation, the processor 1010 may be configured to execute software stored within the memory component 1040, communicate data to and from the memory component 1040, and generally control operations of the DSL modem 710*a-c* pursuant to the software. Software in memory may be read by the processor 1010, buffered within the processor 1010, and then executed.

To implement the vectoring described above, the CPE supports the reception and processing of the orthogonal pilot sequences and reports the normalized error sample relative to the specific sync symbol back to the CO where the CO can process the information to construct the channel matrix representing the FEXT in the cable.

During the tracking phase, to monitor and measure the error, orthogonal pilot sequences are transmitted through the sync symbol to vectoring enabled CPEs. An orthogonal pilot sequence comprises a sequence of a predetermined length such that any two sequences are orthogonal (i.e., their scalar products are zero). To each vector enabled CPE, the CO transmits one of these pilot sequences. The use of orthogonal pilot sequences facilitates the processing for determination of the crosstalk couplings among the subscriber lines connected to vectoring enabled CPEs. Specifically, the crosstalk couplings from a first disturber to a victim are typically computed by correlating the measured error reported by the victim CPE with the orthogonal transmit sequence transmitted by the first disturber CO over the entire duration of the orthogonal sequence. The crosstalk from other disturbers into the victim does not influence the computation of the crosstalk coupling for the crosstalk from the first disturber into the victim if the transmitted signals on the other disturbers are orthogonal to the transmitted signal of the first disturber.

Figure 11:
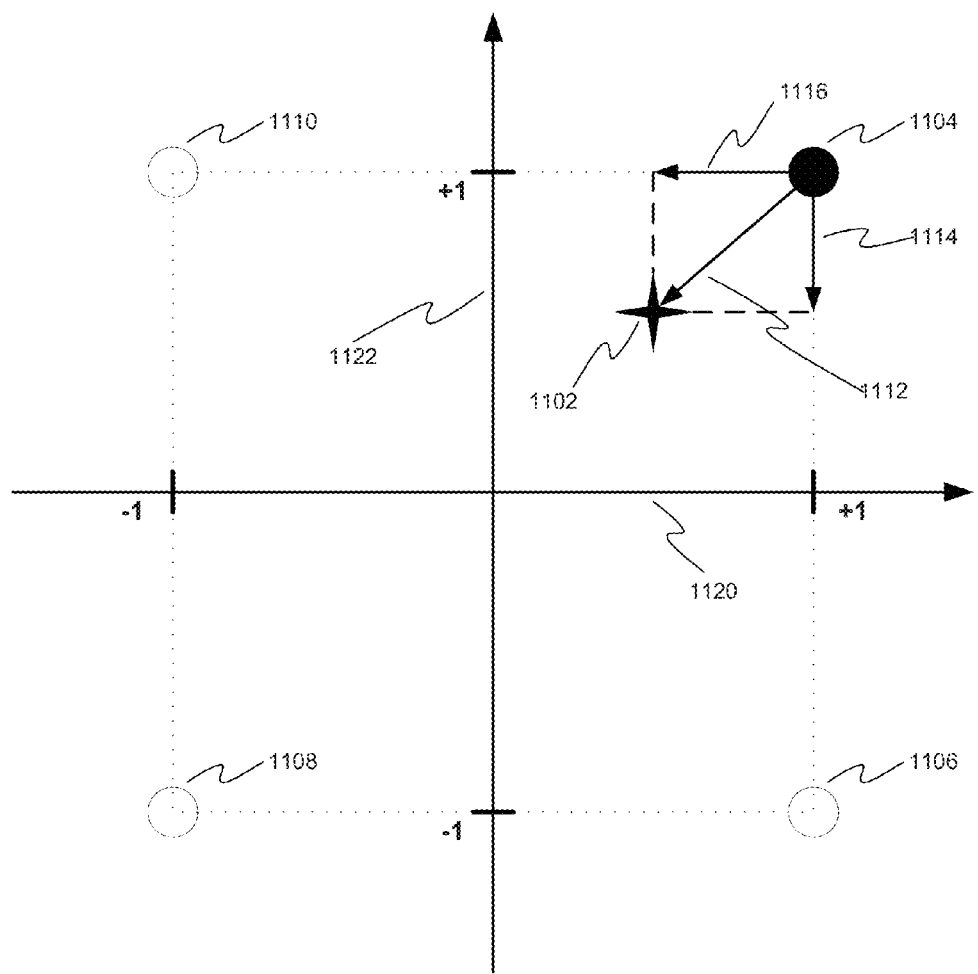
FIG. 11 is a diagram indicative of a representative normalized error sample calculation for a given bin.

FIG. 11 is a diagram indicative of a representative normalized error sample calculation for a given bin. For each bin in an orthogonal pilot sequence, a value of one or zero is encoded to (1, 1) or (−1, −1) in the constellation, shown as and 1108, respectively. However, because of quadrant scrambling the resultant encoded constellation point could also be (1, −1) or (−1, 1), shown as 1106 and 1110, respectively. Since the orthogonal pilot sequences are unique for each line and are synchronized to the sequence transmitted from the CO-side, the CPE can regenerate locally an ideal reference for making correct symbol decisions.

When sample 1102 is received, it is aligned to one of these constellation points, in this particular example constellation point 1104. The constellation points and received sample 1102 can be viewed as complex numbers on the complex plane. Because the pilot sequence may be known by the CPE, the particular constellation point may be predicted by the CPE. However, the CPE may not know the pilot sequence or may not be able to predict the constellation point due to the quadrature scrambling. In this case, real axis 1120 and imaginary axis 1122 act as decision boundaries in order to align received sample 1102 to one of the constellation points. Vector 1112 on the complex plane is the difference between the constellation point and the received sample. Vector 1112 can also be viewed as a complex number with real part 1114 and imaginary part 1116. This is often also referred to as an in-phase component and a quadrature component, respectively. If b bits is the desired resolution for a real number in the error reporting then 2b bits are needed to convey the normalized error sample (b bits for the real part and b bits for the imaginary part). For every bin of a vectored user on which error reporting is required, 2b bits, which are computed on every sync symbol at the rate of the DMT superframe, can therefore be sent back to the CO through the back channel.

Figure 2:
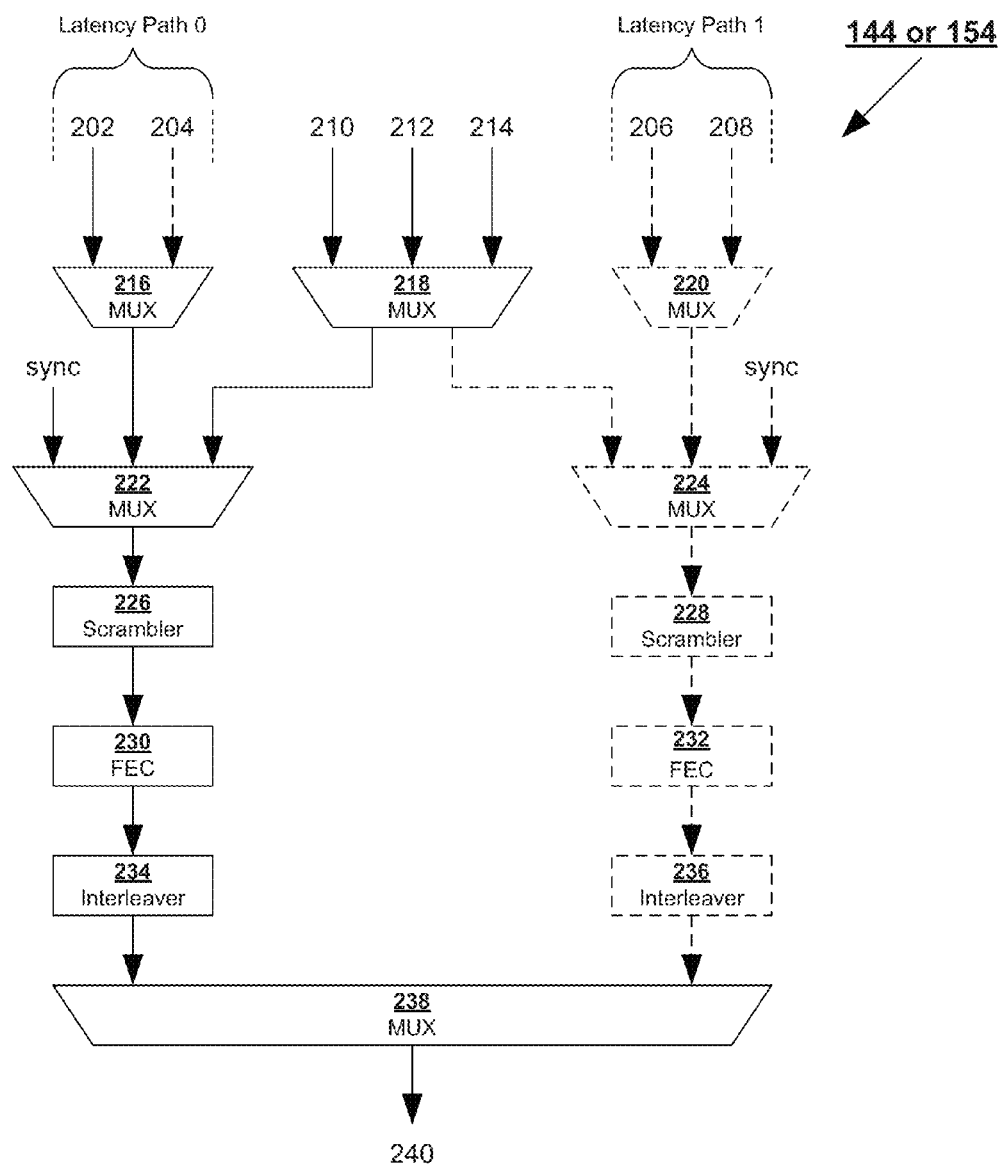
FIG. 2 illustrates a more detailed description of the transmission side of the PMS-TC layer as disclosed by present xDSL standards.

To be most productive the transport of the error samples from each CPE to the CO should be timely and robust. One possible method for passing error samples is to use the dedicated EOC channel 210 as shown in FIG. 2. However, because the EOC is responsible for other functions, only a certain bandwidth would be available for the transport of error samples. A disadvantage of this approach is that this may require an adjustment to the rate of transmission of the error samples, which may affect the update rate of the pre-coding system. Another disadvantage is that the transmission of the error samples may not be associated with the superframe or sync symbol from which the error measurement was made, so additional overhead would be needed to associate the error sample properly with the sync symbol on which the error measurement was made. Associating the error sample with the appropriate sync symbols is essential to the accurate estimation of the pre-coder coefficients. Hence, the creation of a dedicated back channel can ensure adequate bandwidth for the transport of the error samples; as a result it would relieve the complexity in associating each error sample with a sync symbol.

Figure 12A:
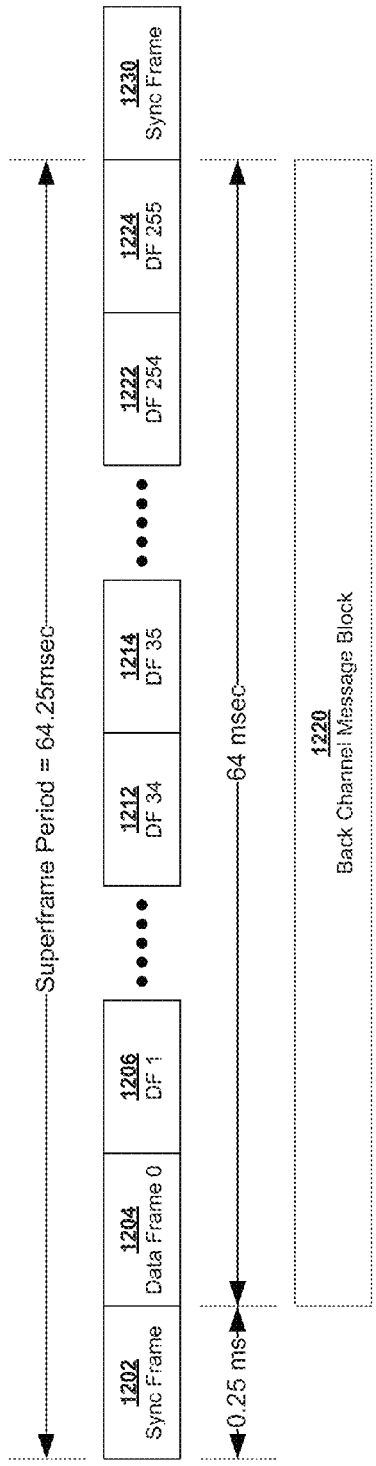
FIG. 12A illustrates a DMT superframe.

FIG. 12A illustrates a DMT superframe. The superframe comprises sync frame 1202 which has a duration of 0.25 milliseconds followed by 256 data frames exemplified in the figure by data frames 1204, 1206, 1212, 1214, 1222 and 1224. Each data frame has a duration of 0.25 milliseconds so the entire superframe has a duration of 64.25 milliseconds. Sync frame 1202 comprises the sync symbol as described above. Also shown in the figure is sync frame 1230 of the subsequent DMT superframe.

During the transmission from CPE to CO (and from CO to CPE for command messages) of the data frames within the DMT superframe is back channel message block 1220 which takes 64 milliseconds to complete the transmission. Back channel message block 1220 can be embedded into some or all of the 256 upstream data frames. Back channel message block 1220 can comprise an acknowledgement to any commands from the CO relating to error measurements such as described above. It can also comprise the measured error samples. Finally, depending on the way the back channel is implemented it can optionally comprise some error detection such as a CRC. For protection against impulse noise, a simple FEC with interleaving can also be applied.

Alternatively, it may not be desirable to begin a back channel message block at the beginning of a DMT upstream superframe. For example, to reduce the amount of buffering needed, it may be important to transmit the back channel message block before reception of the next downstream sync symbol is received. Hence, it is not desirable to wait for the start of the next upstream DMT superframe. In this case, the back channel message block can be split across the upstream DMT superframe boundary.

Figure 12B:
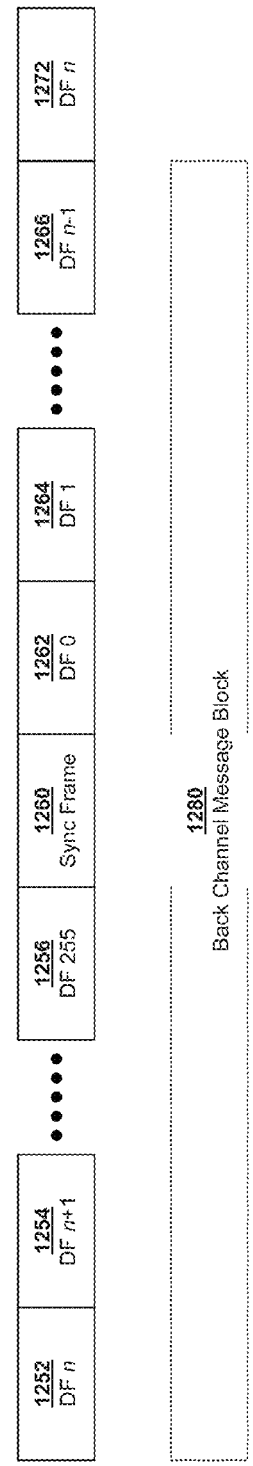
FIG. 12B illustrates a back channel message block split across a DMT superframe boundary.

FIG. 12B illustrates a back channel message block split across a upstream DMT superframe boundary. While back channel message block 1280 still comprises up to 256 data frames it does not necessarily start right after a sync symbol. In this particular example, the back channel message block begins with DMT frame 1252 which is the n-th data frame in the DMT superframe. Back channel message block 1280 ends with DMT frame 1266 which is the data frame n−1 in the subsequent data frame. It should be noted that no data can be transmitted during sync frame 1260. A subsequent back channel message block would then begin with DMT frame 1272. For convenience, the first data frame of a given back channel message block uses shall be referred to as the back channel start frame.

Figure 13:
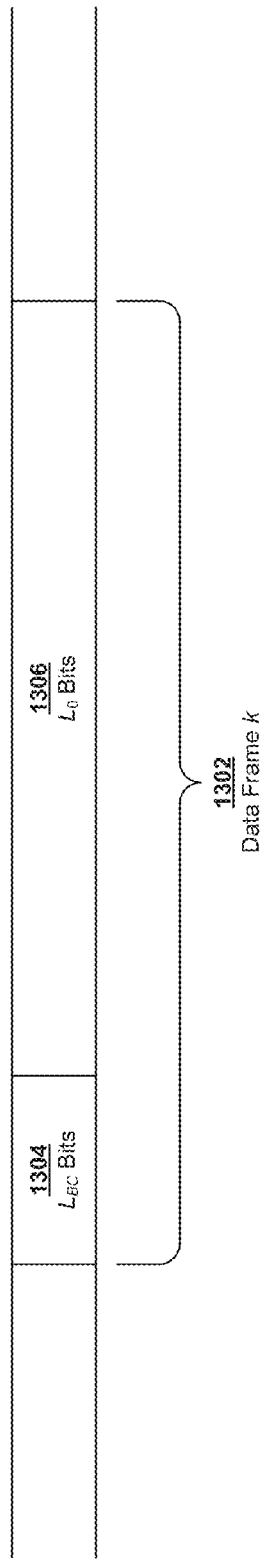
FIG. 13 illustrates a data frame structure which supports the back channel message block.

FIG. 13 illustrates a data frame structure which supports the back channel message block. Each data frame such as data frame 1302 is subdivided into back channel part 1304 and data part 1306. Back channel part 1304 carries $L_{BC}$ bits and data part 1306 carries $L_0$ bits. Data frame 1302 is shown starting with the mapping of the $L_{BC}$ bits first followed by the data part 1306 carrying $L_0$ bits, but other mapping orders are possible. As a result the message block can hold $256 L_{BC}$ bits over a superframe period.

The carrying capacity of the back channel depends on the number of bits per data frame allocated, for example to maintain a minimum bit rate of 256 kb/s. This translates to 16,384 bits for each DMT superframe or 64 bits per data frame. If 8 bits are used to represent real numbers, 16 bits will be needed to represent each normalized error sample due to the need to represent the real and imaginary components of the normalized error sample. At a minimum bit rate of 256 kb/s, the back channel message block has the capability of carrying up to 1024 normalized error samples.

Figure 1:
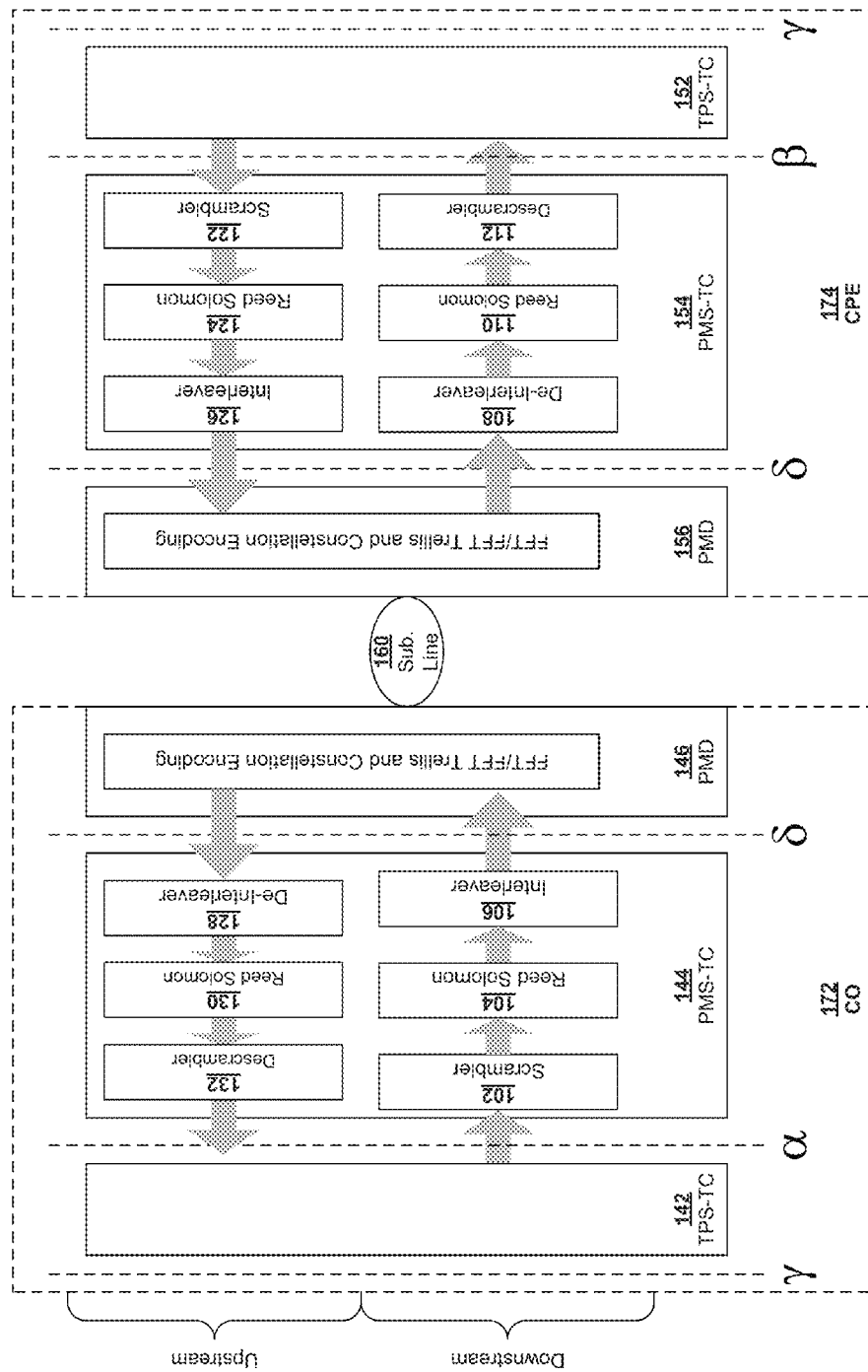
FIG. 1 illustrates DSL communications layering in communications between a CO and a CPE.
Figure 5:
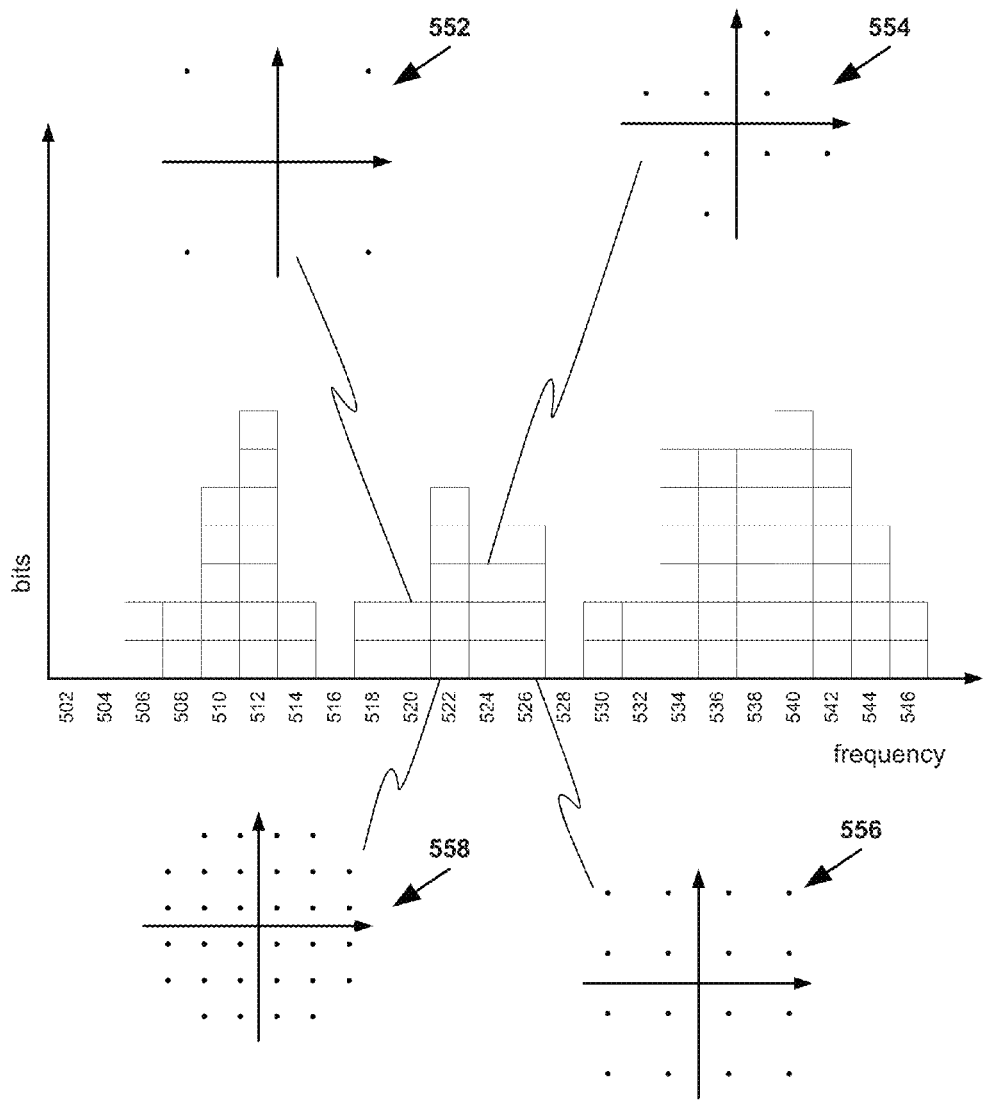
FIG. 5 shows an example of a bit loading profile.
Figure 6:
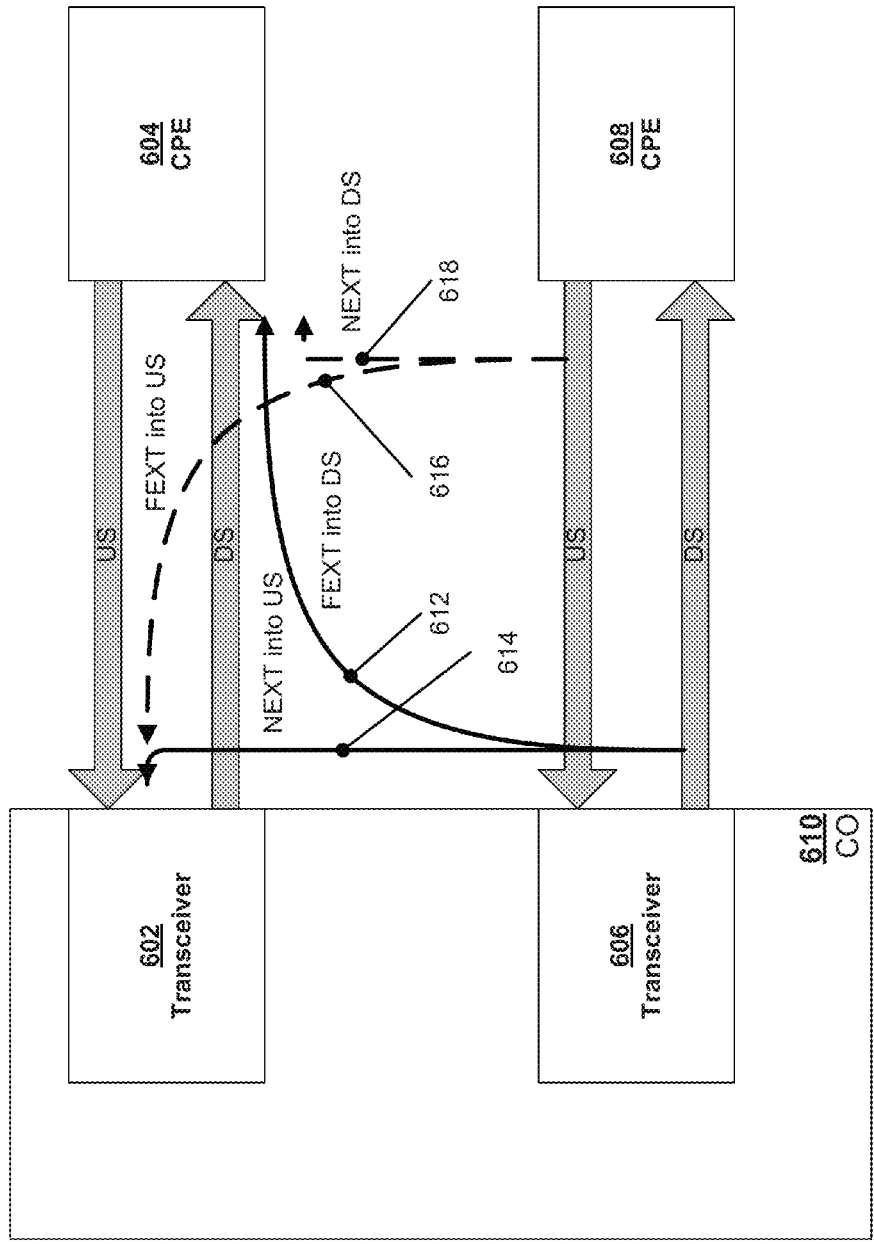
FIG. 6 illustrates the various types of crosstalk typically experienced in a DSL system.
Figure 14A:
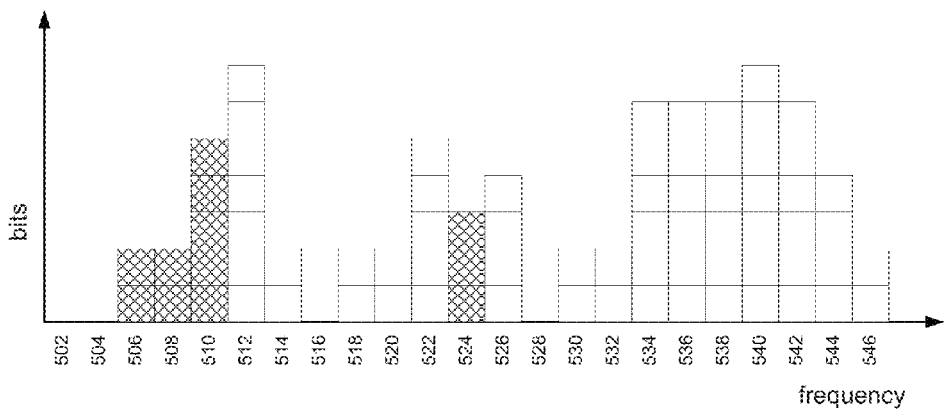
FIG. 14A shows bins dedicated to the back channel.

One method for allocating the $L_{BC}$ bits per data frame is to assign dedicated bins for the back channel. Returning to the bit loading profile example used in FIG. 5, suppose that 12 bits are to be dedicated for the back channel. Using the example of FIG. 1, FIG. 14A shows bins 506, 508, 510 and 524 dedicated to the back channel, each channel contributing 2, 2, 5 and 3 bits, respectively, to the 12 bits. By using this approach, the back channel can be implemented in the PMD layer. By using the PMD layer, the back channel may bypass the FEC supplied by PMS-TC layer. While some degree of error correction is provided by the trellis code, it is recommended that error detection (or error correction) be added to the message block. For example, as suggested above, a CRC could be added to back channel message block 1220.

In order to avoid the overhead needed to identify which sync symbol a given error sample is associated with, the back channel message block in which the back channel information is transmitted should be associated with a corresponding downstream DMT superframe and in particular downstream sync symbol associated with the downstream DMT superframe. This should account for any time delay due to the calculation of the error sample and any round trip delays. For example, if a downstream sync symbol is transmitted at time $t_0$, the returning error samples would be expected in the back channel start frame received at time $t_0+t_e$ where $t_e$ is a predetermined or derived time period offset. Other ways of ensuring correspondence of a particular downstream sync symbol with the back channel start frame can also be used. For example, if it is known that the error samples for a given downstream sync symbol are contained in the back channel message block beginning with data frame n in the upstream DMT superframe being received when the given downstream sync symbol is being transmitted, then a correspondence can be made between the back channel message block beginning with data frame n and the given downstream sync symbol. With the correspondence, the identity of a given error sample can be determined without unduly adding overhead to the communications.

To further enhance robustness, the bins selected as dedicated to the back channel should have large margin. Typically, based on the SNR the numbers of bits a given bin can carry is determined to meet a bit error ratio threshold. In particular DSL standards require that the bit error ratio for any given bin should not exceed $10^{-7}$. Statistically, the bit error ratio is related to the number of bits allocated and the SNR. One approach to making the back channel more robust is to increase the margin on the selected bins. For example, if the margin on the selected bins is increased by a predetermined amount, the number of bits allocated is reduced, but so is the bit error ratio. In a numeric example, suppose bin 510 has an SNR of 32 dB which allows it to support 5 bits with a 6 dB margin (thus the SNR of 32 dB is treated as 26 dB and the value of 26 dB is used to determine the maximum bit-loading that still provides a bit-error-ratio of at most $10^{-7}$). However, instead, during the bit loading process when determining the number of bits for bin 510 a margin of 12 dB is incorporated into the SNR, i.e., the bit loading process treats the SNR as 20 dB. In such a case, the bit loading process is likely to allocate only 3 bits for bin 510.

Another method is to take the existing bit loading profile and map the bits per bin values found in the profile to a "robust" bits per bin value. This mapping could be done by a formula or by a table. For example, if bin 534 normally could support 6 bits according to the existing bit loading profile, only 4 bits will be used. If bin 524 normally could support 3 bits only two bits will be used.

Figure 14B:
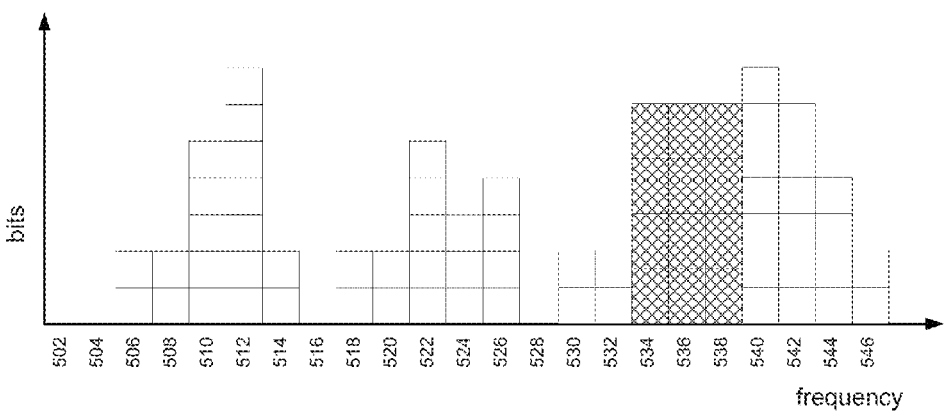
FIG. 14B illustrates an example of bins dedicated to the back channel where additional margin is used.

Regardless of the selection method, additional robustness can be added by using fewer bits per bin for the dedicated back channel bins than the bits per bin that can be supported by those bins. FIG. 14B illustrates an example where bins 534, 536, and 538 are dedicated to the back channel, each providing 4 bits each even though they are capable of supporting 6 bits.

Optimally, the selection of bins for the back channel should be made to have the smallest impact over the amount of data that can still be carried. For example, in some bit loading algorithms, it takes 10 dB of SNR for a bin to be viable for carrying one bit of information, but each additional 3 dB of SNR allows the bin to carry roughly an additional bit. For example, 13 dB of SNR allows for 2-bits, 16 dB of SNR allows for 3-bits, 19 dB of SNR allows for 4-bits, etc. Clearly, not all bin reservation schemes are equivalent. As a demonstration, suppose 6 bits are to be transported on dedicated bins with an additional 6 dB of margin. Based on the exemplary bit loading formula just described, 3 bins having 19 dB of SNR could support the 6 bits needed with the additional margin of 6 dB per bin, i.e., each bin would carry 2 bits of dedicated back channel data. However, it would take 12 bits of bandwidth away from regular data. On the other hand, selecting 2 bins having 22 dB of SNR would also support the 6 bits needed, where each bin would carry 3 bits of dedicated back channel data, but cost only 10 bits of regular data bandwidth. Therefore, an ideal reservation of bins would reserve the desired number of bins for the dedicated back channel while minimizing the loss of bandwidth available for regular data.

One algorithm for selecting an optimal set of reserved bins is to first select bins with the highest SNR and dedicate these bins to the back channel; then proceeding with the bins with the next highest SNR and dedicating those bins to the back channel until the number of bits required for the back channel has been reached or unless a predetermined threshold has been reached. If the predetermined threshold is reached, the number of bits lost to the back channel from the regular data channel is too high and further allocation to the back channel would result in an unacceptable loss of capacity.

A protocol or negotiation can be put into place to accommodate the possibility that the CPE cannot accommodate the bit rate requested by the CO for the back channel. For example, the CO may request that a certain bin group be monitored for its error at a given resolution of 2b bits per complex error sample, which may be translated to k bits per DMT frame needed to be dedicated for the back channel. However, based on the communication capacity of the CPE computed from the bit loading profile, it is determined that by supporting k bits per DMT frame would exceed the allowed drop in true upstream data carrying capability. Then the CPE can respond that it can only carry k' bits per DMT frame or simply respond stating it can only support a corresponding resolution of 2b' bits per complex error sample. A lower resolution error sample can still be of use to the CO for determining pre-coder coefficients, but may require more error samples for convergence to the desired set of pre-coder coefficients, leading to longer convergence time.

Figure 4:
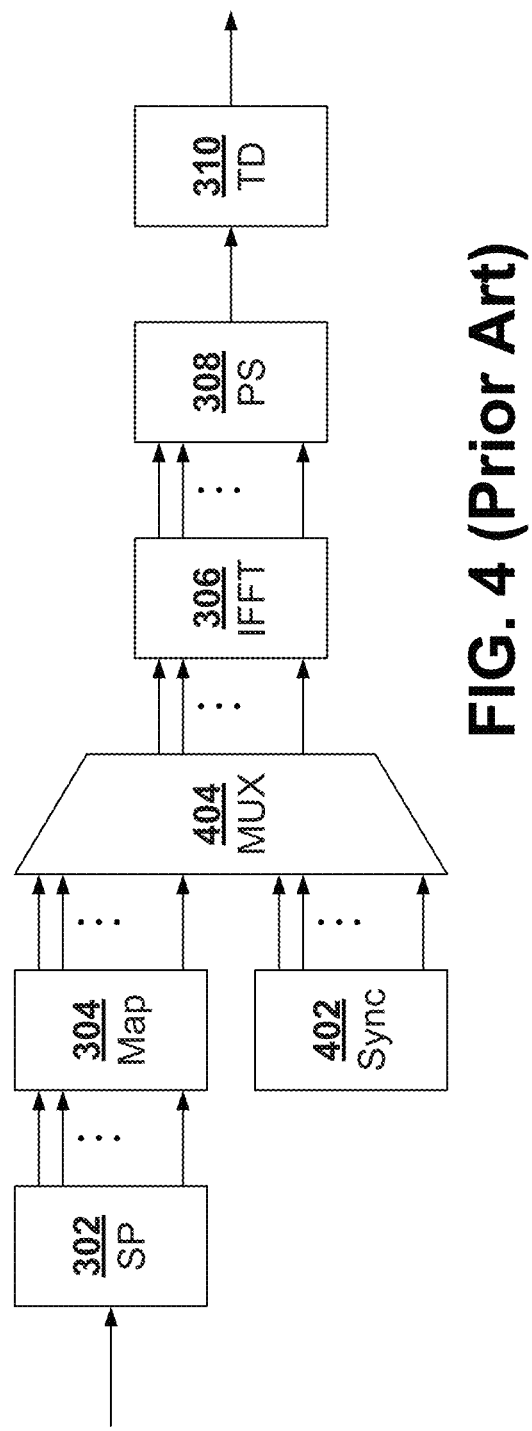
FIG. 4 illustrates a more detailed description of the transmission side of the PMD layer with the inclusion of a sync symbol.

FIG. 15 illustrates an implementation of the PMD layer in a CPE in accordance with an embodiment of the invention. The receiver portion of the PMD layer supports making error measurements and has similar components as that described in the receiver portion shown in FIG. 3B, but further comprises demultiplexer 1502 which extracts the sync symbol and supplies it to error sampling module 1504, but passes the other 256 DMT frames in a DMT superframe to de-mapper 340. The transmitter portion of the PMD layer supports the transmission over a back channel using dedicated bins and has similar components as that described in FIG. 4, but further comprises back channel module 1506. Back channel module 1506 directs serial-to-parallel converter 302 to not map any data to the bins used in the back channel. Back channel module 1506 supplies data to be transmitted over the back channel to the mapper by placing portions of the data on the channels associated with the dedicated bins. Finally, optionally, back channel module 1506 indicates to mapper 304 the number of bits for the dedicated bins. It may do this either by separately supplying the information to mapper 304 or by altering the bit loading profile supplied to mapper 304. Similarly, back channel module 1506 can prevent serial-to-parallel converter 302 from assigning data to the dedicated bins by either directly supplying the bins to serial-to-parallel converter 302 or by altering the bit loading profile supplied to serial-to-parallel converter 302.

Error measurement and transmission module 720 comprise both error sampling module 1504 and back channel module 1506. When a sync symbol is received by the CPE, error sampling module 1504 measures the error and may optionally store it for transmission back to the CO. Back channel module 1506 takes the error measurement and transmits it back to the CO as described above. One advantage of using dedicated bins to support the back channel is that the entire error measurement and transmission procedure is performed by the CPE PMD layer without the need for the error transmission to be performed at a higher level. As a result, the higher communications layers need not be aware of the error sampling or transmission activity.

Figure 16:
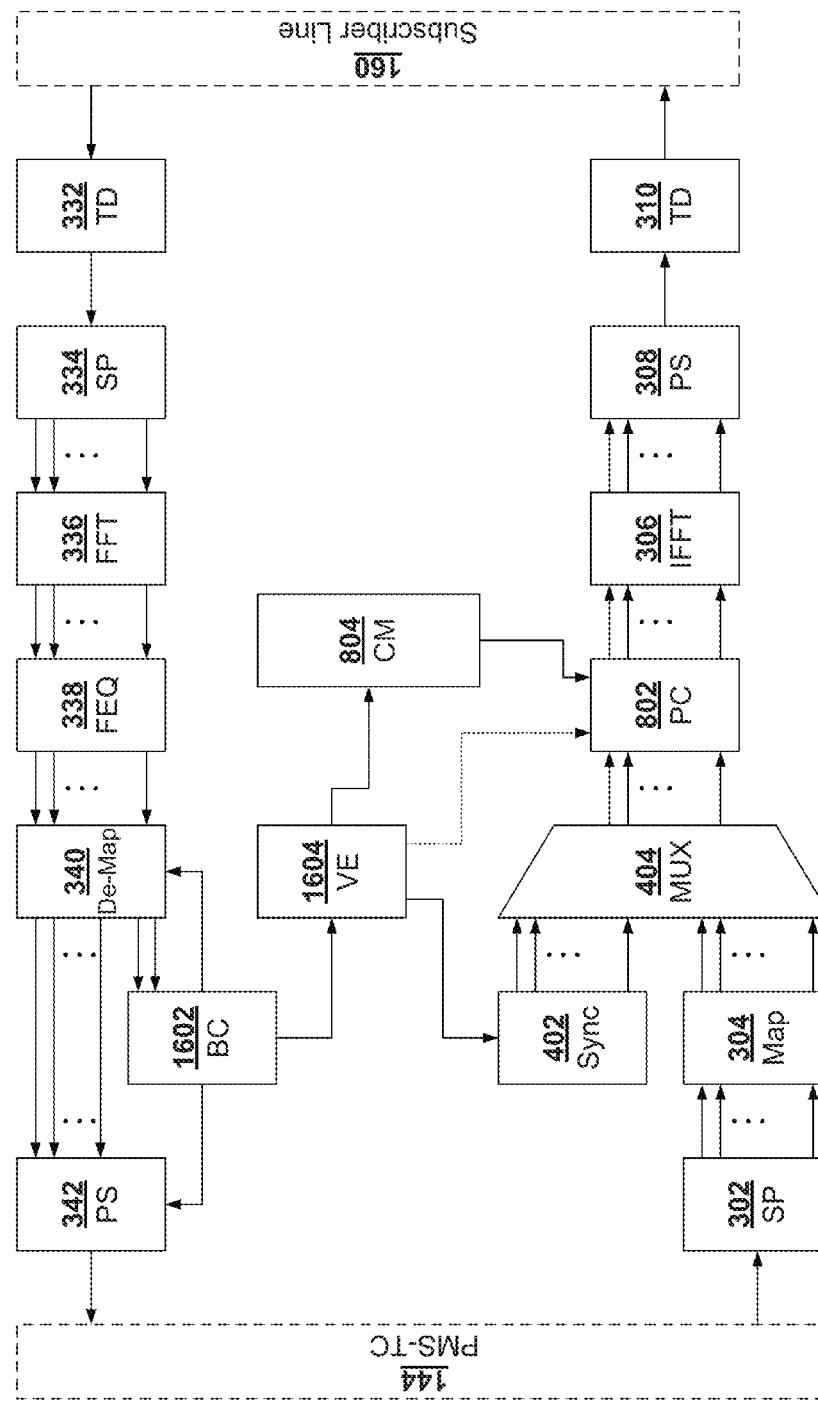
FIG. 16 illustrates an implementation of the PMD layer in a CO transceiver in accordance with an embodiment of the invention.

FIG. 16 illustrates an implementation of the PMD layer in a CO transceiver in accordance with an embodiment of the invention. The receiver portion of the PMD layer supports receiving back channel information and has similar components as that described in the receiver portion shown in FIG. 3B, but further comprises back channel receiver 1602. Back channel receiver 1602 optionally indicates to de-mapper 340, the number of bits per bin used in the dedicated bins for the back channel. This may be simply relaying that information to de-mapper 340 or altering the bit loading profile seen by de-mapper 340. Additionally, back channel receiver 1602 optionally informs parallel-to-serial converter 342 which bins are dedicated to the back channel and should not be used in reconstructing the serial data bit stream. Again, the information may simply be supplied to parallel-to-serial converter 342 or an altered bit loading profile with the dedicated bins assigned zero bits could be supplied to parallel-to-serial converter 342. In addition, the back channel receiver 1602 receives the data modulated on the dedicated bins from de-mapper 340 as demodulated and decoded data. Back channel receiver 1602 then assembles the back channel message block as the DMT superframe is received.

Once received, the back channel message block is transmitted to vector processing entity 1604, which uses the back channel message to calculate or update the channel matrix used in module 804. Channel matrix 804 is fed into pre-coder 802 as described above for FIG. 8. Alternatively, vector processing entity 1604 can update pre-coder 802 directly using the back channel message. In this implementation, the receiving of the back channel data including the error measurements, the calculation of the channel matrix and the adjustment of pre-coder 802 could be implemented without the need for data to leave the PMD layer. This prevents the need of the higher communications layer to be aware of the FEXT reduction taking place.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A method for dedicated back channel communications for communicating error samples in a Digital Subscriber Line (DSL) system comprising: measuring errors in downstream data communicated on the DSL; forming error samples corresponding to the measured errors; reserving a plurality of bins from among a total number of bins available for upstream communication over the DSL for the dedicated back channel communications; encoding the error samples onto the plurality of bins; and simultaneously transmitting upstream the error samples using the plurality of reserved bins over the DSL and transmitting encoded user data using bins not reserved for the dedicated back channel communications from a customer premises equipment (CPE), wherein the error samples enable Far-End Crosstalk (FEXT) pre-coder coefficients to be derived.

2. The method of claim 1, wherein the error samples are measured in a downstream sync symbol and the error samples are transmitted over an upstream back channel message block corresponding to the downstream sync symbol.

3. The method of claim 1, wherein the reserving the plurality of bins comprises allocating a number of bits per bin for each bin in the plurality of bins wherein the allocating uses an additional signal to noise ratio (SNR) margin over a margin used in bins not reserved for the dedicated back channel communications.

4. The method of claim 3, wherein the additional SNR margin is 6 dB or 12 dB.

5. The method of claim 1, wherein the reserving the plurality of bins comprises allocating a number of bits per bin for each bin in the plurality of bins wherein the allocating uses a bit loading profile and allocates bits based on the number of bits specified for a bin in the bit loading profile.

6. The method of claim 1, wherein each bin has a SNR and the reserving the plurality of bins comprises selecting the bins with the highest SNR.

7. The method of claim 1, wherein the errors are measured between received sync symbols and the constellation points corresponding to the received symbols.

8. A Digital Subscriber Line (DSL) modem comprising: a processor; a line driver; and a memory comprising instructions wherein the instructions cause the processor to: receive an orthogonal pilot sequence during downstream sync symbols; measure an error sample based on the received orthogonal pilot sequence; format the error sample into a message block; encode the message block onto a plurality of bins from among a total number of bins available for communication over the DSL, the plurality of bins reserved for dedicated back channel communications for communicating error samples; and simultaneously cause the line driver to transmit upstream the message block using the plurality of bins over the DSL and to transmit encoded user data using bins not reserved for the dedicated back channel communications from a customer premises equipment (CPE), wherein the error samples enable Far-End Crosstalk (FEXT) pre-coder coefficients to be derived.

9. The DSL modem of claim 8, wherein the instructions further cause the processor to process the reception of a command relating to the error samples; and add acknowledgement information into the message block.

10. The DSL modem of claim 9, wherein the command specifies a resolution of each error sample, or specifies a bin group for error measurement or combination thereof.

11. The DSL modem of claim 10, wherein the acknowledgement information specifies the resolution of the error samples that the DSL modem is capable of transmitting.

12. The DSL modem of claim 9 wherein the message block comprises error detection data.

13. The DSL modem of claim 12 wherein the error detection data is a cyclic redundancy code.

14. The DSL modem of claim 8, wherein the DSL modem is a vectoring enabled Very High Speed Digital Subscriber Line (VDSL) modem.

15. The DSL modem of claim 8, wherein the instructions further cause the processor to measure the error sample based on received orthogonal pilot sequence and its corresponding constellation point.

16. A method of measuring downstream errors comprising: transmitting a first orthogonal pilot sequence downstream to a first customer premises equipment (CPE) during a first downstream sync symbol; receiving a first back channel message block corresponding to the first downstream sync symbol from the first CPE, said first back channel message block encoded on a plurality of bins from among a total number of bins available for upstream communication over a Digital Subscriber Line (DSL), the plurality of bins reserved for dedicated back channel communications for simultaneously communicating error samples derived from the first orthogonal pilot sequence while communicating encoded user data using bins not reserved for the dedicated back channel communications; extracting the error samples from the first back channel message block; and deriving pre-coder coefficients using the extracted error samples, wherein the pre-coder coefficients comprise Far-End Crosstalk (FEXT) pre-coder coefficients.

17. The method of claim 16 further comprising:
transmitting a second orthogonal pilot sequence that is orthogonal to the first orthogonal sequence to a second CPE during a second downstream sync symbol which is synchronized to the first downstream sync symbol;
receiving a second back channel message block corresponding to the first downstream sync symbol from the second CPE, said second back channel message block encoded on a second plurality of bins from among the total number of bins available for communication over the DSL subscriber line, the second plurality of bins reserved for the dedicated back channel communications; and
extracting error samples from the second back channel message block.

18. The method of claim 16 further comprising transmitting a command specifying a bin group for error measurement, where the command comprises a unique identifier associated with the bin group.

19. The method of claim 16 further comprising transmitting a command specifying the resolution for the error samples.

20. The method of claim 16 wherein each bin in the plurality of bins has an associated number of bits, wherein the associated number of bits is allocated using an additional signal to noise ratio (SNR) margin over a margin used in bins not reserved for the dedicated back channel communications.

21. The method of claim 16 wherein each bin in the plurality of bins has an associated number of bits, wherein the associated number of bits is derived from an existing bit loading profile.

22. The method of claim 16, wherein each bin has a SNR and the plurality of bins is selected from the bins with the highest SNR.

23. The method of claim 16 further comprising deriving the error samples from the first orthogonal pilot sequence and the constellation points corresponding to the first orthogonal pilot sequence.

* * * * *

UNITED STATES PATENT AND TRADEMARK OFFICE
CERTIFICATE OF CORRECTION

| | | |
|---|---|---|
| PATENT NO. | : 8,817,907 B2 | Page 1 of 1 |
| APPLICATION NO. | : 12/412191 | |
| DATED | : August 26, 2014 | |
| INVENTOR(S) | : Sorbara et al. | |

It is certified that error appears in the above-identified patent and that said Letters Patent is hereby corrected as shown below:

In the Specification,

In Column 9, Line 18, delete "group I" and insert -- group 1 --, therefor.

In Column 11, Line 4, delete "shown as and" and insert -- shown as 1104 and --, therefor.

Signed and Sealed this
Twenty-fifth Day of November, 2014

Michelle K. Lee
*Deputy Director of the United States Patent and Trademark Office*